US008249964B2

(12) United States Patent
DePena (10) Patent No.: US 8,249,964 B2
(45) Date of Patent: Aug. 21, 2012

(54) METHODS FOR FACILITATING CHARITABLE DONATIONS THROUGH LINKS TO INDEPENDENT FINANCIAL TRANSACTIONS

(76) Inventor: Bo DePena, San Antonio, TX (US)

( * ) Notice: Subject to any disclaimer, the term of this patent is extended or adjusted under 35 U.S.C. 154(b) by 1469 days.

(21) Appl. No.: 11/255,772

(22) Filed: Oct. 21, 2005

(65) Prior Publication Data

US 2007/0094112 A1 Apr. 26, 2007

(51) Int. Cl.
G06Q 40/00 (2012.01)
(52) U.S. Cl. .......................................................... 705/35
(58) Field of Classification Search ................ 705/1, 35, 705/38, 316, 313, 1.1, 39, 329
See application file for complete search history.

(56) References Cited

U.S. PATENT DOCUMENTS

| | | | | |
|---|---|---|---|---|
| 4,870,576 | A * | 9/1989 | Tornetta | 705/313 |
| 5,466,919 | A | 11/1995 | Hovakimian | |
| 5,555,497 | A * | 9/1996 | Helbling | 705/14 |
| 5,663,547 | A | 9/1997 | Ziarno | |
| 6,088,682 | A | 7/2000 | Burke | |
| 6,253,998 | B1 | 7/2001 | Ziarno | |
| 6,519,573 | B1 | 2/2003 | Shade et al. | |
| 6,542,875 | B1 * | 4/2003 | Mulvihill et al. | 705/35 |
| 6,581,041 | B1 | 6/2003 | Canney | |
| 6,765,594 | B2 * | 7/2004 | Hautt et al. | 715/764 |
| 6,898,575 | B2 | 5/2005 | Mull | |
| 7,219,071 | B2 * | 5/2007 | Gallagher | 705/14.14 |
| 2002/0029179 | A1 * | 3/2002 | Gruber et al. | 705/35 |
| 2002/0052756 | A1 * | 5/2002 | Lomangino | 705/1 |
| 2002/0120539 | A1 * | 8/2002 | Price | 705/35 |
| 2003/0028483 | A1 * | 2/2003 | Sanders et al. | 705/40 |
| 2003/0200102 | A1 * | 10/2003 | Tao | 705/1 |
| 2003/0229596 | A1 * | 12/2003 | Martinez | 705/64 |
| 2004/0093302 | A1 * | 5/2004 | Baker et al. | 705/37 |
| 2004/0111281 | A1 * | 6/2004 | Witter | 705/1 |
| 2004/0220823 | A1 * | 11/2004 | Brush et al. | 705/1 |
| 2005/0165620 | A1 * | 7/2005 | Sturm et al. | 705/1 |
| 2005/0289040 | A1 * | 12/2005 | Lecker et al. | 705/37 |
| 2006/0206417 | A1 * | 9/2006 | Selby | 705/38 |
| 2007/0203825 | A1 * | 8/2007 | Hanifin et al. | 705/38 |
| 2008/0097874 | A1 * | 4/2008 | Reardon et al. | 705/27 |

OTHER PUBLICATIONS

Roselle Zayas; "Port Charlotte, Fla., Real Estate Firm to Donate Part of Commission to Charity"; Sun Herald (Port Charlotte, Fl.); Dec. 12, 2001, Wednesday; p. 1.*
Lesley Mitchell; Three Wasatch Front Companies to Give Part of Home-Sale Earnings to Charities; They are willing to settle for a smaller commission to generate more business; The Salt Lake Tribune (Utah); Apr. 15, 1998, Wednesday: pp. 1 and 2.*
"Last Weapon in the crusade of affordable housing"; Ventura County Star (California); Jun. 1, 2004 Tuesday; pp. 1 and 2.*

(Continued)

*Primary Examiner* — Ella Colbert
(74) *Attorney, Agent, or Firm* — Kammer Browning PLLC (57) ABSTRACT

A method for facilitating donations to a charitable organization in which a first financial transaction involving property is linked to a second financial transaction involving a charitable donation. A fundraising program facilitates the transactions which directly contribute to affiliated charitable organizations. A property seller aligns with the fundraising program to list their property and selects a charitable organization to receive the donation. The fundraising program affiliates agent/brokers to sell the listed property. All fees and transactions are regulated through a title company at closing. The title company funds a commission to the agent/broker, a referral fee to the fundraising program, a nominal administrative fee to the fundraising program, and a percentage of the property's sale price to the charitable organization.

9 Claims, 6 Drawing Sheets

OTHER PUBLICATIONS

Gebe Martinez and Barbara Isenberg; "Charitable Groups Cheer Clinton Tax Proposal Donations: Plan Expands break given to those who make contributions of art, stocks and real estate. [Home Edition]"; Los Angeles Times: Feb. 20, 1993: pp. 1-3.*

KRTBN Knight Ridder Tribune Business News-North County Times-ESCO; "Charities express surprise, graditude at offer to donate home sale proceeds"; Jul. 15, 2005; pp. 1 and 2.*

Leonard, R.; "Lean, mean, and automated; realtors are using PCs to adapt to hard times"; Information Week, No. 374;; May 18, 1992; p. 1.*

PRNewsWire; "E-Realty.com Closes 35th Transaction, Espansion to Austin Nearing"; Nov. 1, 1999; p. 1.*

Lord, Ken; "Answering" The Realtor's Call; Desktop Computer, v3, n12; Dec. 1983; p. 1.*

Nathan Isaacs; "Kennewick, Wash., couple donates $6 million warehouse to city"; KRTBN Knight-Ridder Tribune Business News—Tri-City Herald—Kennewi; Dec. 8, 2004; pp. 1 and 2.*

Courier-Islander, Campbell River, B.C.; "Tax-smart gifts get most out of charitable giving; [Final Edition]"; Dec. 22, 2004; pp. 1 and 2.*

Chase V. Magnuson, Commercial Investment Real Estate; "Give & receive: Donating real estate to charities offers valuable tax savings"; Sep./Oct. 2002, vol. 21, Issue 5; p. 1.*

Stephenson, Sian; Law Now; "Charitable giving"; Feb./Mar. 2001, vol. 25, Issue 4; pp. 1-3.*

Asolfo Pesquera; KRTBN Knight—Ridder Tribune Business News—San Antonio Express-News; "Broker looks to help children while selling houses"; Oct. 19, 2005; pp. 1 and 2.*

* cited by examiner

FIG. 1

FIG. 2
(Scenario I)

FIG. 3

FIG. 4
(Scenario II)

FIG. 5

FIG. 6
(Scenario III)

METHODS FOR FACILITATING CHARITABLE DONATIONS THROUGH LINKS TO INDEPENDENT FINANCIAL TRANSACTIONS

BACKGROUND OF THE INVENTION

1. Field of the Invention

The present invention relates generally to methods for making charitable donations. The present invention relates more specifically to methods for facilitating charitable donations which are linked to independent financial transactions.

2. Description of the Related Art

Although many charitable organizations do an excellent job of helping those in need, these organizations have historically suffered from various funding problems. Some of the reasons for these funding difficulties are related to poorly developed efforts to inform the community about opportunities to contribute to the charity, inadequate strategies to encourage such contributions, inconvenient donation vehicles, unreliable collection methods, and distribution delays.

Some effort has been made in the past to devise creative alternatives to promote charitable giving. These efforts have generally been directed to organizing and expediting the donation process. In general, these methods simply assist the donor in the contribution process or enable the donor to control various aspects of the contribution. These charitable donation methods are not typically integrated with other financial transactions. Some of these past efforts are reflected in issued U.S. Patents which include the following:

U.S. Pat. No. 6,898,575, issued to Mull entitled Systems and Methods for Charitable Donating describes an electronic donor-directed charitable donation system designed specifically for the Internet, whereby the donor can direct the disposition of the donation. Specific needs are identified by the charitable organization and the donor can give money to be applied for those specific needs. The system also has a listing of participating merchants that provide goods and services needed by the charitable organization which can be purchased by the institution with a system debit card.

U.S. Pat. No. 6,519,573 issued to Shade et al. entitled System and Method for Charitable Giving likewise describes an Internet-based method which enables selective three-party charitable donations. The host operates the web site or other support services and the donor visits the web site and selects a donation amount and a recipient. The host transmits the gift to the recipient along with a unique code which enables the recipient to redeem the gift by visiting the host web site and selecting a charity from a list of available charitable options. The gift is then sent to the selected donee charity by the host.

U.S. Pat. No. 6,581,041, issued to Canney entitled Method of Charitable Giving/Investing describes a method of systematically tying investing with giving by designing a fee structure within an investment whereby part of the fee is automatically transferred to a donor-advised account within a charitable community foundation. A charitable liaison will usually introduce a donor to this process of giving/investing. In addition, the donor will often have an investment advisor. Both the liaison and advisor will receive a part of the fee associated with the investment. The charitable giving may be associated with an investment such as a mutual fund or with a consumer purchase in a credit/debit card context.

U.S. Pat. No. 5,466,919 issued to Hovakimian entitled Credit/Charge Card System Enabling Purchasers to Contribute to Selected Charities describes a method which enables a credit cardholder to make a donation to a cardholder-selected charity any time he makes a purchase using the credit card. Similarly, U.S. Pat. No. 6,088,682 issued to Burke entitled Funds Distribution System Connected with Point of Sale Transactions describes an automated way for sales establishments to extend point of sale cash transactions to allow consumers to save, change, or transfer discretionary funds into saving or donating accounts managed by a central clearinghouse.

U.S. Pat. No. 5,663,547, issued to Ziarno entitled Method of Fund-raising with a Keyless Contribution and Gift Commitment Management Device describes a way to simplify and induce contributions by prospective givers. Keyless, electronic contribution devices are dispersed through a crowd of prospective givers for immediate entry of data regarding the giver. U.S. Pat. No. 6,253,998, also issued to Ziarno entitled Fund-raising Terminal and Method for Accepting Monetary Contributions by Use of an Information Bearing Card describes a way to induce and facilitate the solicitation and contribution of a large number of individuals at fund-raising events using card records such as credit and debit cards.

There are also business methods for managing real estate brokerage referrals, computing comparative values of real estate, and securitizing and trading real estate brokerage options. None of these methods which are related to real estate transactions are also connected to charitable donations.

While various attempts have been made in the past to provide methods to organize and expedite charitable giving, none of these methods are designed to integrate the charitable donation process with a real estate transaction. There would be distinct advantages to linking charitable donations to funds generated from the sale of real property. Specifically, the seller could designate the charity to receive the funds, the amount of a donation from such a transaction could be sizable, the donor already anticipates significant financial expenditures relating to such a major transaction, and the donor is likely to prefer a charitable organization be the recipient of such funds rather than a third party real estate company or salesperson. However, the requirements for structuring such a relationship between property owners/sellers and third party real estate companies and charitable organizations are simply not met by any method described in the prior art.

It would therefore be desirable to have a method whereby a property owner could contribute to a charitable organization, market and sell their property cost-effectively, and potentially receive tax benefits from such a transaction. It would further be desirable to have a charity benefit from the established financial practices involved in the sale of real estate, with such a transaction providing an ideal donation vehicle with a highly reliable method of collection. It would also be desirable to have a charitable donation method whereby such donations were encouraged through their connection to one of the most important financial transactions entered into by most individuals: the sale of real property. Additionally, it would be beneficial to link a charitable donation to a real estate transaction because of the familiar nature of such a common transaction which typically involves the exchange of large amounts of money. A method which linked charitable donation to a real estate transaction would encourage the donation of relatively large sums in a manner which is likely to be perceived as both appealing and financially sound.

SUMMARY OF THE INVENTION

It is therefore an object of the present invention to provide a method which integrates the charitable donation process with a real estate transaction. The present method links the relationship between property owners/sellers and third party real estate companies with non-profit charitable organizations. This objective is accomplished through a charitable fund-raising program which facilitates real estate-related transactions that directly contribute to non-profit charitable organizations. The fund-raising program fosters cooperation and collaboration between property sellers and non-profit charitable organizations.

In the present invention, a property owner/seller and a third-party real estate company are linked to strategically create a unique and innovative business method designed to facilitate potentially tax-deductible contributions to non-profit organizations and, at the same time, create an avenue to provide property sellers a more cost effective way to market their property and simultaneously potentially provide them a tax savings. The types of property which could be sold using the method of the present invention include both unimproved and improved residential and commercial properties.

In a typical traditional real estate transaction, a property owner/seller chooses to list their property for sale with a real estate agent/broker and associated real estate company. When their property is sold, the seller must pay a commission equal to six percent of the property's sales price at closing. Three percent of the commission is typically paid to the listing agent and three percent of the commission is typically paid to the selling agent. If the listing agent sells the property, they receive the entire commission, i.e., six percent.

In the preferred method of the present invention, a property owner/seller aligns their property with the fundraising program to list their property for sale, as opposed to a real estate company. In this preferred method, the property owner/seller pays only a three percent commission to a real estate company assigned through the fundraising program. Additionally, the property seller, instead of paying a further three percent listing commission to a third-party real estate company, agrees to give a potentially tax-deductible donation to one of the non-profit charities aligned with the fundraising program. The donation amount is potentially tax deductible and is based on a sum equal to one percent of the property's selling price. Finally, the property owner/seller pays a nominal administrative fee to the fundraising program to apply towards its listing and transaction related costs. Thus, the total cost to the property seller is a three percent brokerage commission fee to the selling realtor/broker, a one percent donation to the cooperating charity and a nominal administrative fee to the fundraising program.

Both the traditional real estate company and the fundraising program of the present invention obtain property listings, i.e., the exclusive right to represent the property seller with the sales transaction of their property. In this respect, the fundraising program does compete with most real estate companies in the market. However, the goals for obtaining such a listing may be diverse. For example, a traditional real estate company may list a property for a typical/competitive commission fee. In some markets this amount may be six percent. After the sale, the listing company, if the property was sold by a third party agent/broker, will typically retain one-half of the commission fee paid by the property seller or three percent of the total sale price, as the listing agent. The entire fee (six percent) is paid to the listing agent/broker who in turn pays the buyers agent/broker (selling side) its half or three percent of the commission fee.

In contrast, in the present invention, the fundraising program would not charge the property seller a listing fee, instead the property seller would pay only a three percent buyers agent/broker (selling side) commission payable directly to the outside agent/broker (through the title company) who represented the buyer who purchased the property. This is a major difference between the basic business method of the present invention and a traditional real estate company. After listing a property for sale, a traditional company will receive calls from individuals generated by Internet-related searches or drive-by traffic. In addition, they may receive calls from real estate agents/brokers representing potential buyers. If a potential buyer does not have agent/broker representation, the listing company will attempt to recruit the potential buyer as one of their customers in order to capitalize on the opportunity to generate a buyer's side commission or revenue. This is yet another substantial difference between the business methods of the fundraising program of the present invention and a traditional real estate company.

The fundraising program of the present invention does not represent potential property buyers. Instead, the fundraising program assigns a third party traditional real estate agent to each property it lists and then refers all the potential property buyers to the assigned third party real estate company. The third party real estate company will then show the property listed with the fundraising program in hope of generating a sale for its client, the property buyer. In the event that the potential property buyer is not interested in making an offer to buy the fundraising program home, the third party assigned agent/broker then has the opportunity to recruit the potential buyer as its client, to show and sell any property available in the marketplace.

Finally, a key fundamental difference between the fundraising program of the present invention and traditional real estate companies is that the fundraising program is not a real estate company in principle and mission. The fundraising program is a facilitator of charitable donations specifically for non-profit charitable organizations. Its primary purpose is to act as a tool for fundraising for charities and promoting the well being of the community and society.

There are some traditional real estate companies across the country that may, from time to time, donate a portion (usually a nominal amount of their commissions), to charity as a marketing tool. In some cases, the real estate company will contribute the donation in the name of the home seller, but in most cases, the potential tax advantage benefit will be taken by the real estate company. However, these companies are not similar in their design, mission or business method to that of the fundraising program of the present invention.

DETAILED DESCRIPTION OF THE PREFERRED EMBODIMENTS

Figure 1:
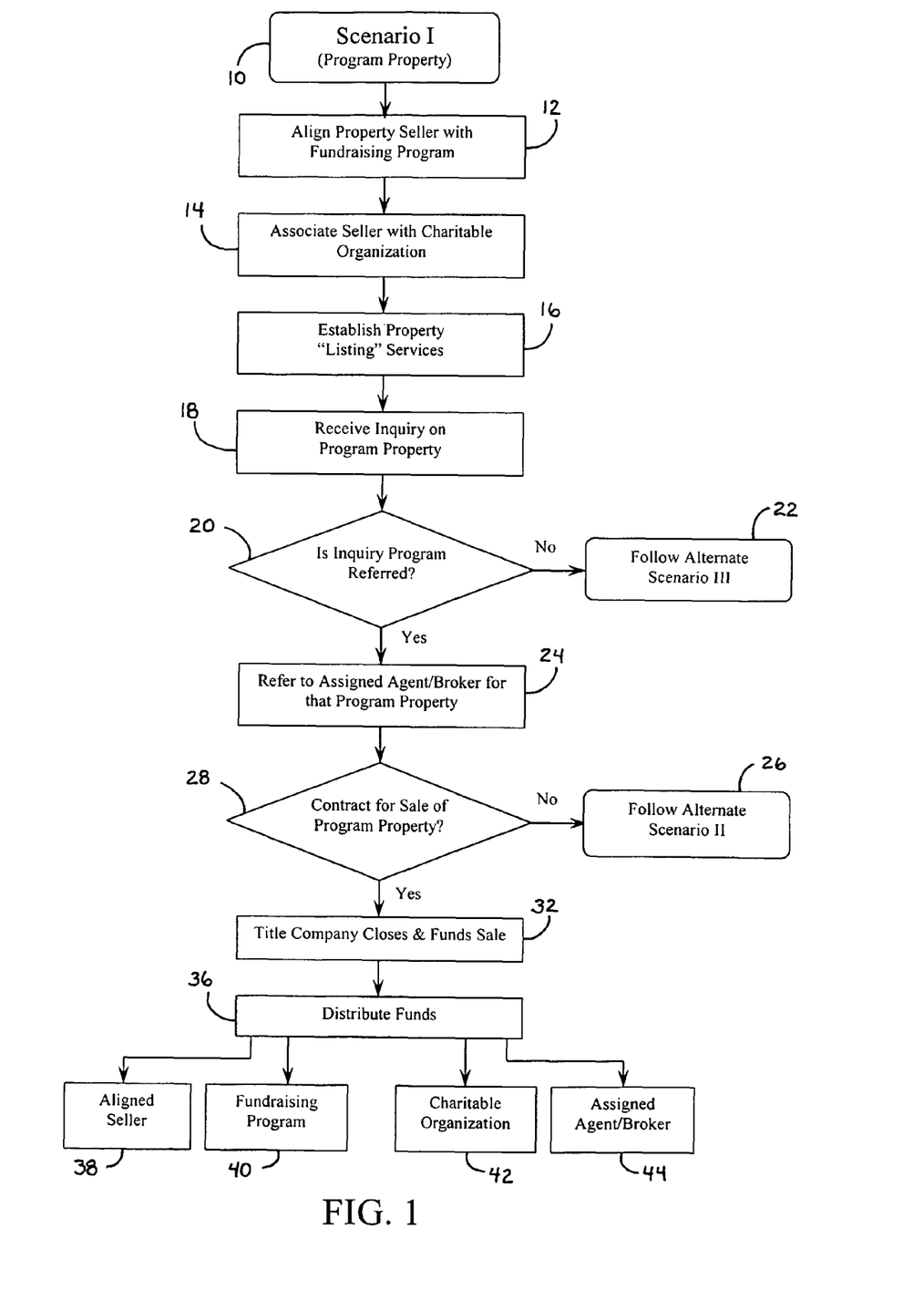
FIG. 1 is a flowchart of a first preferred method of implementing the process according to the present invention.

In the method of the present invention, three general scenarios are possible with respect to the fundraising program aligned agents/brokers and properties. Reference is made first to FIG. 1 for a brief description of Scenario I, a first preferred method 10 according to the present invention. In the first scenario, an agent/broker is aligned with the fundraising program and sells a property which is listed by the fundraising program to a buyer who is referred by the program.

In a typical Scenario I process, the fundraising program receives a call from a property owner/seller. During this contact, the program concept and procedures are explained to the seller. The seller is given an information package containing typical data forms, disclosure information, a seller's property condition addendum, and a charitable donation pledge form. An agent/broker aligned with the fundraising program then meets with the seller to collect the signed paperwork, and perform other typical tasks including: presenting a listing agreement for signature, inspecting the property, photographing the property, and setting up signage. After the appropriate documents are signed, the agent is assigned, the data is input into a multiple listing service system and added to the program website, and the property seller is sent the contact information for the assigned agent.

If the property seller has a preferred agent that is not aligned with the fundraising program, an interview with the non-aligned agent is set up for possible alignment with the fundraising program. Calls from potential property buyers are referred to the assigned agent/broker and all property showings are scheduled through the fundraising program. The property seller funds a nominal administrative fee to the fundraising program and pledges one percent of the sales price to their chosen aligned charity.

As discussed above and shown particularly in FIG. 1, the property seller is aligned with the fundraising program at Step 12. The seller selects one of the non-profit charitable organizations which is aligned with the fundraising program at Step 14. This organization will receive a pledged one percent of the sales price at closing if the seller's property is sold.

Figure 5:
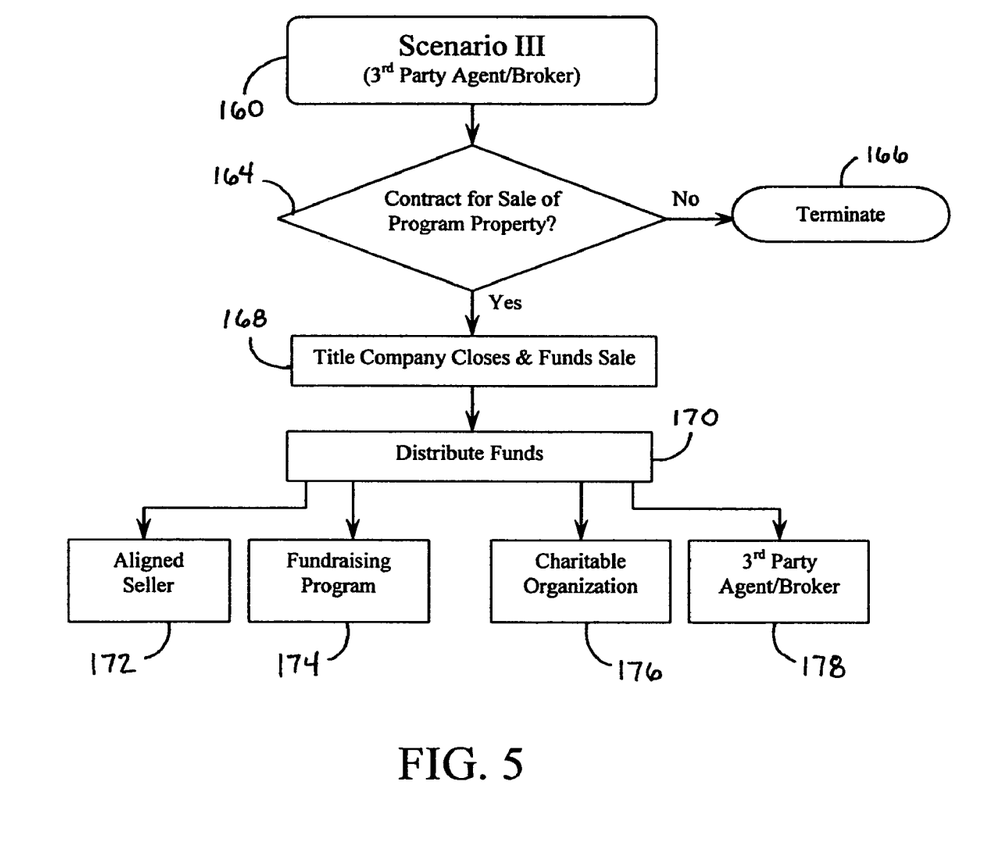
FIG. 5 is a flowchart of a third preferred method of implementing the process according to the present invention.

The property listing services are established at Step 16 as described above. When an inquiry is received from a potential buyer at Step 18, a determination is made as to whether the buyer is program-referred at Step 20. If not then at Step 22, the procedures of Scenario III as shown in FIG. 5 are followed as described below. If the buyer is program-referred (i.e., learned about the program property through one of the marketing efforts of the program), the buyer is then referred to the assigned agent/broker for that piece of property at Step 24.

If a contract for sale of the program property occurs at Step 28, the title company closes and funds the sale at Step 32. The funds are distributed at Step 36 such that the aligned seller 38 receives the proceeds from the sale of the property minus the usual closing costs and the monies paid to the fundraising program, the charitable organization, and the assigned agent/broker. The fundraising program 40 receives a nominal administrative fee, the charitable organization 42 receives one percent of the sales price of the property, and the assigned agent/broker 44 receives a three percent commission.

Figure 3:
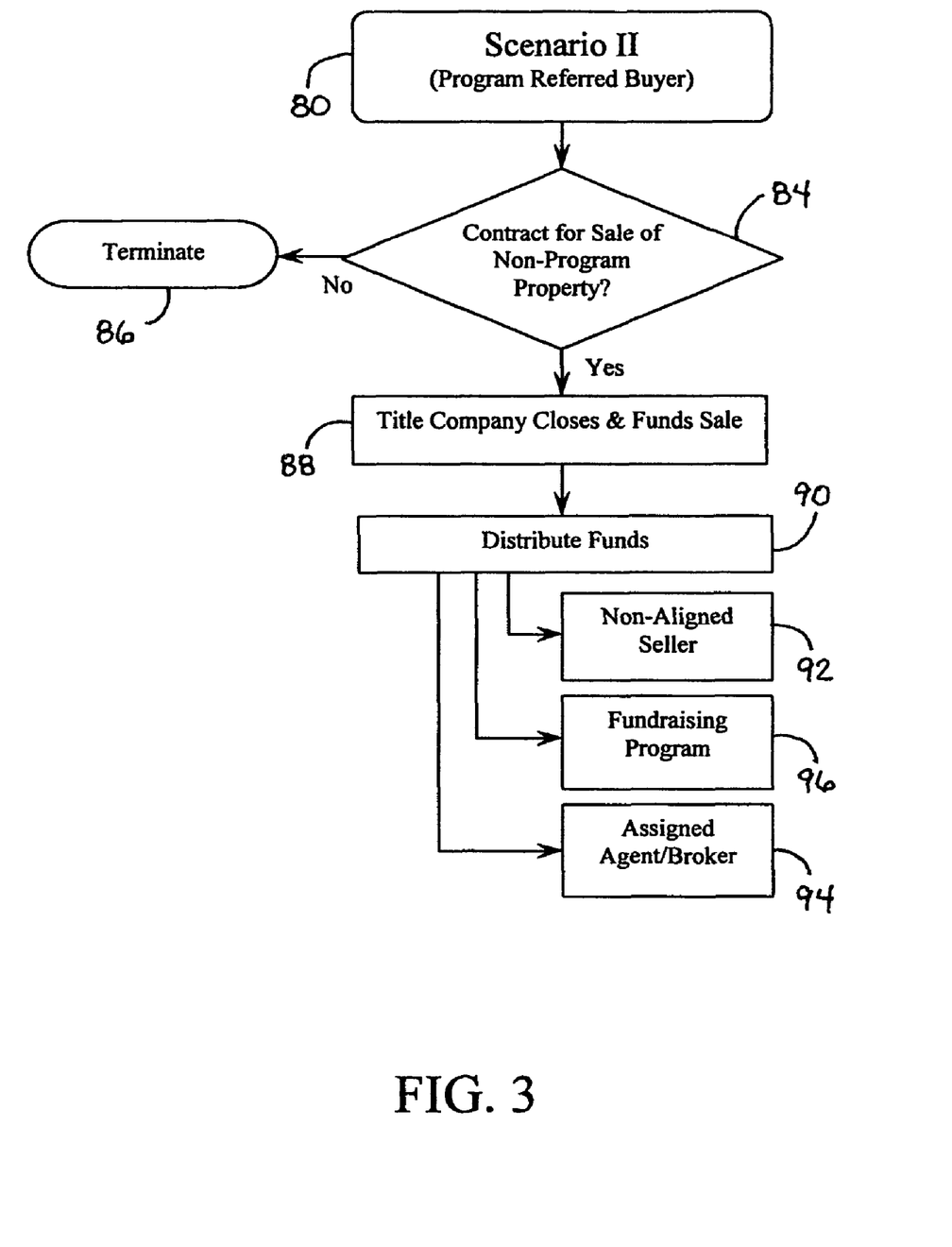
FIG. 3 is a flowchart of a second preferred method of implementing the process according to the present invention.

If a contract for sale of the program property does not occur, the assigned agent/broker then has the opportunity to recruit the potential buyer as its client, to show and sell any property available in the marketplace, by following alternate Scenario II as directed in Step 26. If a contract for sale occurs with such a property, the alternate procedures of Scenario II as shown in FIG. 3 are followed as described below. If no contract occurs, then the relationship terminates (see FIG. 3).

Figure 2:
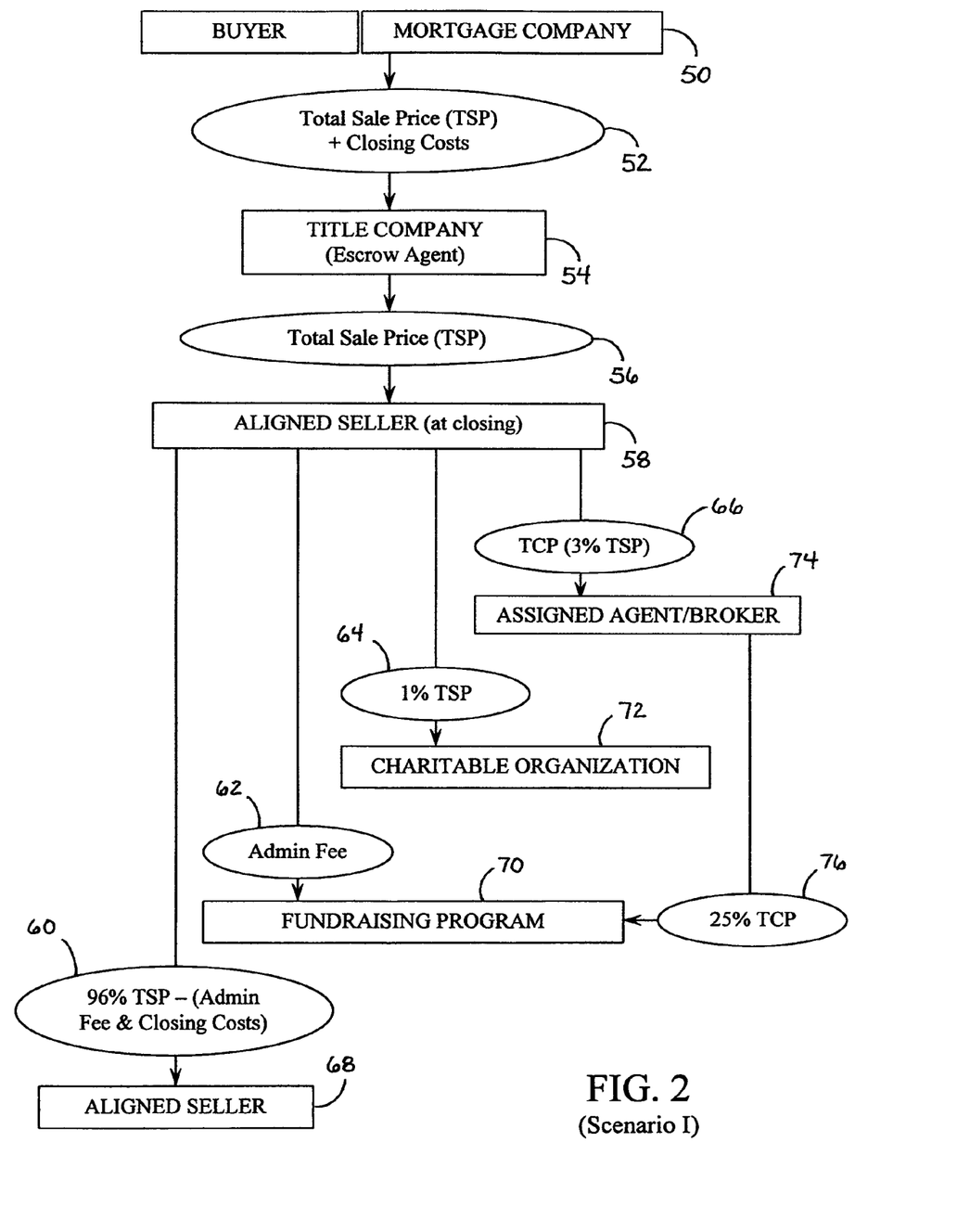
FIG. 2 is a flowchart representing the flow of money through the process according to the first preferred method of the present invention shown in FIG. 1.

As shown in FIG. 2 (representing the flow of funds in Scenario I), the buyer and/or mortgage company 50 pay the total sales price (TSP) and closing costs 52 to the title company or escrow agent 54. All fees and transactions are regulated through the title company at the time of closing. The TSP portion 56 goes to the seller at closing 58, from which the various fees are distributed. The title company funds a commission equal to three percent (total commission paid to assigned agent/broker, i.e. TCP) of the TSP 66 to the assigned agent/broker 74, who in turn pays 25% of the TCP as a referral fee 76 due to the fundraising program 70. The charitable organization 72 receives the pledged one percent of the TSP 64. A nominal administrative fee 62 is paid to the fundraising program 70. The seller 68 then receives the remaining balance 60 from the TSP less other customary closing costs.

In the second method 80 of Scenario II of the present invention, as shown in FIG. 3, the assigned agent/broker attempts to sell a third party property, not listed by the fundraising program, to a fundraising program referred client. If a contract for sale occurs for such a property at Step 84, all fees and transactions are regulated through the title company at the time of closing at Step 88. If no sale occurs, then the relationship terminates at Step 86. The title company distributes the funds at closing at Step 90. The non-aligned seller 92 receives the proceeds from the sale of the property minus the usual closing costs, the assigned agent/broker 94 receives a three percent commission, and the fundraising program 96 receives a referral fee.

Figure 4:
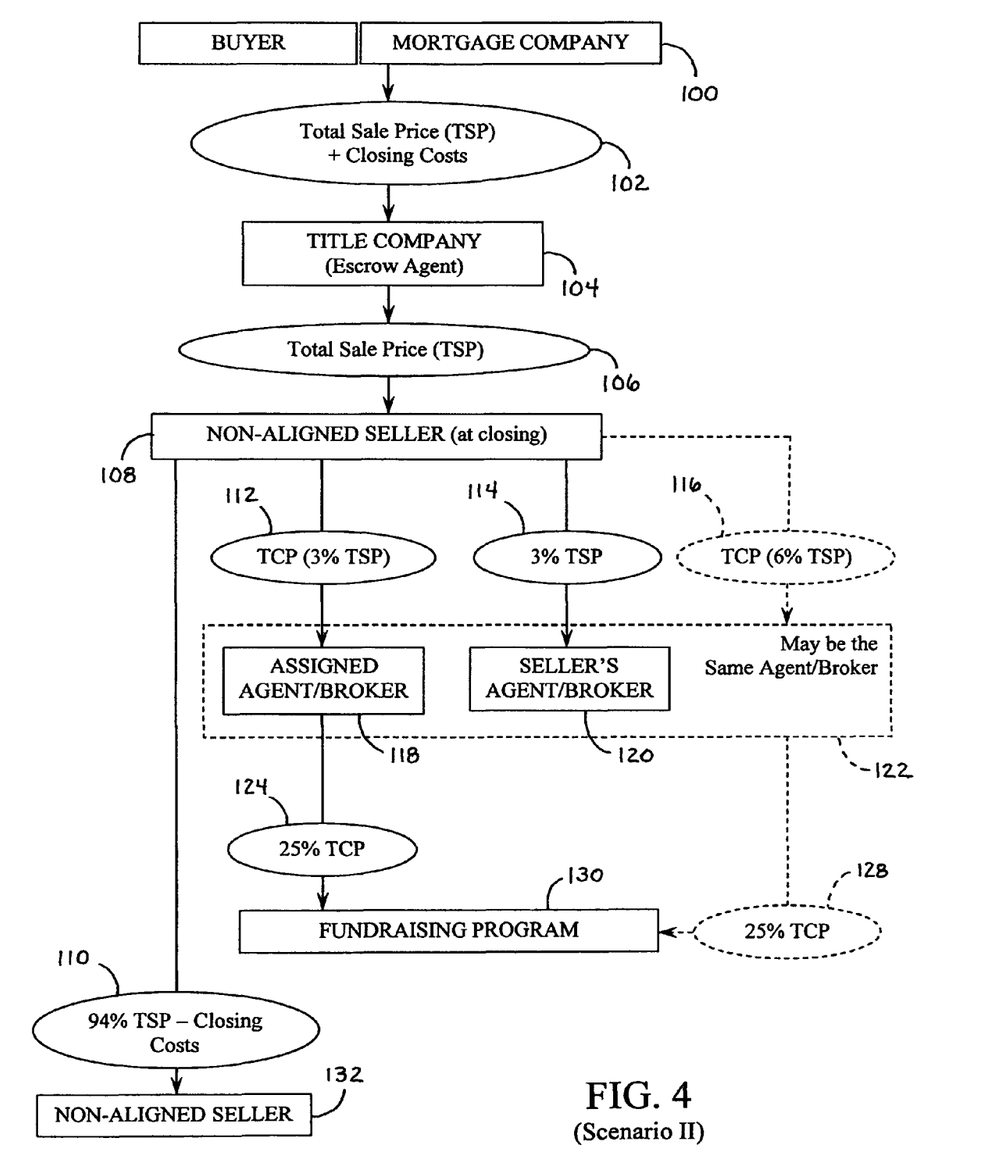
FIG. 4 is a flowchart representing the flow of money through the process according to the second preferred method of the present invention shown in FIG. 3.

As shown in FIG. 4 (representing the flow of funds in Scenario II), the buyer and/or mortgage company 100 pay the total sales price (TSP) and closing costs 102 to the title company or escrow agent 104. All fees and transactions are regulated through the title company at the time of closing. The TSP 106 goes to the non-aligned seller at closing 108, from which the various fees are distributed. The title company funds a commission equal to three percent (total commission paid to assigned agent/broker, i.e. TCP) of the TSP 112 to the assigned agent/broker 118, who in turn pays 25% of the TCP as a referral fee 124 due to the fundraising program 130.

The seller's agent/broker 120 receives a commission equal to three percent of the TSP 114, unless the assigned agent/broker 118 was also the seller's agent/broker. In cases in which the assigned agent/broker sells their own listing, the assigned agent/broker 122 receives a commission of six percent of the total sales price (TSP) 116 less a 25% referral fee 128 due to the fundraising program 130. The title company or assigned agent/broker funds a referral fee equal to 25% of the total commission paid (TCP) to the assigned agent/broker 128 to the fundraising program 130. The non-aligned seller 132 then receives the remaining balance 110 from the TSP less other customary closing costs.

Under the third method 160 of Scenario III of the present invention as shown in FIG. 5, a third party agent/broker who is not affiliated with the fundraising program sells a property which is listed by the fundraising program. If a contract for sale occurs for such a property at Step 164, all fees and transactions are regulated through the title company at the time of closing at Step 168. If no sale occurs, then the relationship terminates at Step 166. Since all fees and transactions are regulated through the title company at the time of closing, the title company distributes the funds at Step 170. The aligned seller 172 receives the proceeds from the sale of the property minus the usual closing costs and the monies paid to the third party agent/broker 178, the fundraising program 174, and the charitable organization 176.

Figure 6:
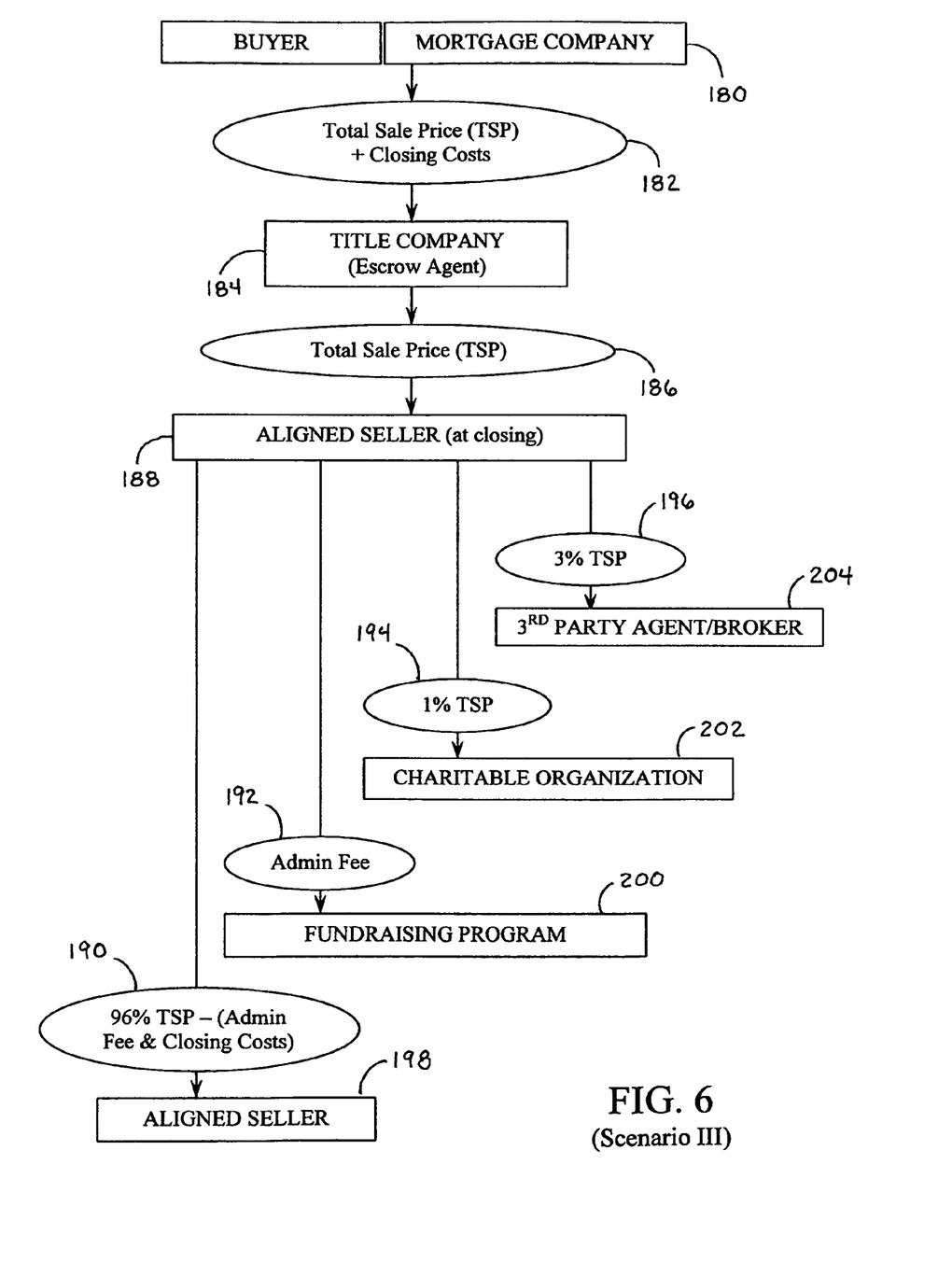
FIG. 6 is a flowchart representing the flow of money through the process according to the third preferred method of the present invention shown in FIG. 5.

As shown in FIG. 6 (representing the flow of funds in Scenario III), the buyer and/or mortgage company 180 pay the total sales price (TSP) and closing costs 182 to the title company or escrow agent 184. All fees and transactions are regulated through the title company at the time of closing. The TSP 186 goes to the aligned seller 188 at closing, from which the various fees are distributed. The title company funds a commission equal to three percent (total commission paid to third party agent/broker, i.e., TCP) of the TSP 196 to the third party agent/broker 204. The title company funds a nominal administrative fee 192 to the fundraising program 200. The charitable organization 202 receives the pledged one percent of the TSP 194. The aligned seller 198 then receives the remaining balance 190 from the TSP less other customary closing costs.

The highlights of the three scenarios of the present invention are listed in Table I below, along with comparisons to the methodology of a traditional real estate company. Although the present invention has been described in conjunction with a number of preferred methods, those skilled in the art will recognize further alterations of the process described that still fall within the scope of the invention as defined by the claims that follow.

TABLE 1

| Present Invention | Traditional Real Estate Company |
|---|---|
| Scenario I: | |
| Assigned Agent/Broker sells a property listed by the fundraising program to a fundraising program referred buyer.      All fees and transactions are regulated through the title company at the time of closing.      The title company will          Fund a commission equal to 3% of the property's sales price to assigned agent/broker (less a 25% referral fee due to fundraising program),          Fund a referral fee equal to 25% of the 3% commission paid to the assigned agent/broker to fundraising program,          Fund nominal administrative fee to fundraising program,          Fund 1% to pledged aligned charity.  Paid by Fundraising Program Property Seller: Total commission = 3%  Total potential tax deductible donation = 1%  Nominal Administrative Fee | Traditional Agent/Broker sells a home listed by their managing Real Estate Company.      All fees and transactions are regulated through the title company at the time of closing.      The title company will          Fund a commission equal to 6% of the home's sales price to the listing Agent/Broker's company.  Paid by Home Seller: Total commission = 6% |
| Scenario II: | |
| Assigned Agent/Broker sells a third party property, not listed by fundraising program, to a fundraising program referred client.      All fees and transactions are regulated through the title company at time of closing.      The title company will          Fund 3% (6% if the property is listed by the assigned agent/broker) of the property's sales price to assigned agent/broker (less 25% referral fee due to fundraising program)          Title company or aligned agent/broker shall fund a referral fee equal to 25% of the commission received by the assigned agent/broker to fundraising program  Paid by Property Seller (not fundraising program client): Total commission = 6% | Traditional Agent/Broker sells a home listed by a third party traditional real estate company.      All fees and transactions are regulated through the title company at time of closing.      The title company will          Fund 6% of the home's sales price to listing agent/broker          The listing agent/broker funds 3% of the home's sales price to selling agent/broker  Paid by Home Seller: Total commission = 6% |
| Scenario III: | |
| Third party Agent/Broker that is not affiliated with fundraising program sells a fundraising program listed property.      All fees and transactions are regulated through the title company at the time of closing.      The title company will          Fund a 3% commission fee to the third party agent/broker          Fund nominal administrative fee to fundraising program          Fund 1% to pledged aligned charity.  Paid by Fundraising Program Property Seller: Total commission = 3%  Total potential tax deductible donation = 1%  Nominal Administrative Fee | Traditional Agent/Broker sells a home listed by a third party traditional real estate company.      All fees and transactions are regulated through the title company at time of closing.      The title company will          Fund 6% of the home's sales price to listing agent/broker          The listing agent/broker funds 3% of the home's sales price to selling agent/broker  Paid by Home Seller: Total commission = 6% |

I claim:

1. A method for facilitating a donation to a charitable organization contemporaneous with the sale of a property, the method comprising the steps of:

(a) inviting a first financial transaction involving the sale of a property from a property seller to a property buyer, and a contemporaneous second financial transaction involving a donation from the property seller to a charitable organization, the step of inviting comprising the steps of:

(i) providing a website based fundraising program, the property seller listing the property with the fundraising program, and selecting a charitable organization;

(ii) linking the first financial transaction involving the listed property to the second financial transaction involving the charitable donation within the fundraising program;

(iii) modifying an existing property listing service database to include data identifying the link between the first financial transaction involving the listed property and the second financial transaction involving the charitable donation;

(b) conditioning the second financial transaction involving the charitable donation by the property seller on the linked first financial transaction taking place;

(c) completing the first financial transaction between the property seller and a property buyer; and (d) completing the second financial transaction between the property seller and the selected charitable organization.

2. The method of claim 1, wherein the step of providing a website based fundraising program further comprises the step of affiliating at least one agent/broker with the fundraising program.

3. The method of claim 2, wherein the step of completing the first financial transaction further comprises the step of the fundraising program assigning an affiliated agent/broker to the first financial transaction.

4. The method of claim 3, wherein the step of completing the first financial transaction further comprises the steps of:

funding a commission based on a percentage of the property's sale price to the assigned agent/broker less a referral fee due to the fundraising program;

funding the referral fee based on a percentage of the assigned agent/broker's commission to the fundraising program; and funding a nominal administrative fee to the fundraising program.

5. The method of claim 2, wherein the step of completing the first financial transaction further comprises the step of identifying a property buyer.

6. The method of claim 5, wherein the property buyer is a program referred buyer, wherein a program referred buyer is any property buyer not represented by an agent/broker unaffiliated with the fundraising program.

7. The method of claim 5, wherein the property buyer is not a program referred buyer, that is any property buyer not represented by an affiliated agent/broker.

8. The method of claim 7, wherein the step of completing the first financial transaction further comprises the steps of:

funding a commission based on a percentage of the property's sale price to the unaffiliated agent/broker; and funding a nominal administrative fee to the fundraising program.

9. The method of claim 1, wherein the step of completing the first financial transaction further comprises the step of regulating the first financial transaction through a title company, the step of regulating comprising the title company controlling the receipt, escrow, and distribution of all funds associated with the first financial transaction and the second financial transaction.

* * * * *